(12) United States Patent
Petty

(10) Patent No.: US 10,138,136 B2
(45) Date of Patent: Nov. 27, 2018

(54) LIQUID FILTER DEVICE

(71) Applicant: New Aqua, LLC, Avon, IN (US)

(72) Inventor: Bret L. Petty, Avon, IN (US)

(73) Assignee: New Aqua, LLC, Avon, IN (US)

( * ) Notice: Subject to any disclaimer, the term of this patent is extended or adjusted under 35 U.S.C. 154(b) by 299 days.

(21) Appl. No.: 15/019,968

(22) Filed: Feb. 9, 2016

(65) Prior Publication Data

US 2016/0236117 A1 Aug. 18, 2016

Related U.S. Application Data

(60) Provisional application No. 62/116,260, filed on Feb. 13, 2015.

(51) Int. Cl.
| | | |
|---|---|---|
| *B01D 24/14* | (2006.01) | |
| *C02F 1/00* | (2006.01) | |
| *C02F 1/50* | (2006.01) | |
| *C02F 5/00* | (2006.01) | |
| *C02F 101/10* | (2006.01) | |

(52) U.S. Cl.
CPC .............. *C02F 1/002* (2013.01); *B01D 24/14* (2013.01); *C02F 1/505* (2013.01); *C02F 5/00* (2013.01); *C02F 2101/101* (2013.01); *C02F 2201/003* (2013.01); *C02F 2201/004* (2013.01); *C02F 2209/005* (2013.01); *C02F 2303/16* (2013.01); *C02F 2303/22* (2013.01); *C02F 2307/10* (2013.01)

(58) Field of Classification Search
CPC .... B01D 24/12; B01D 24/14; B01D 24/4631; B01D 24/001; C02F 1/002; C02F 1/505; C02F 5/00; C02F 2101/101; C02F 2201/003; C02F 2201/004; C02F 2209/005; C02F 2303/16; C02F 2303/22; C02F 2307/10
See application file for complete search history.

(56) References Cited

U.S. PATENT DOCUMENTS

| | | | | |
|---|---|---|---|---|
| 3,747,768 | A * | 7/1973 | Barrera ................. | B01D 24/14 210/288 |
| 4,267,870 | A * | 5/1981 | Warner ................. | F16B 39/101 411/122 |
| 2014/0027369 | A1* | 1/2014 | Saul ....................... | B01D 24/22 210/293 |

\* cited by examiner

*Primary Examiner* — Matthew O Savage
(74) *Attorney, Agent, or Firm* — Brinks Gilson & Lione

(57) ABSTRACT

A liquid filter device can filter liquid flowing therethrough using a granulated filter media included in a tank. The liquid filter device can perform a backwash of the granulated filter media by creating active zones and inactive zones in the tank. In the active zones, the granules are agitated and driven by a flow of liquid toward the top of the tank. In the inactive zones, the granules fall by gravity toward the bottom of the tank. The liquid filter device can include a conduit, a hub and a number of laterals, each of which may individual fit through an opening in the tank and be assembled to form a combined structure that will not fit through the opening in the tank. The active zones may be created above a top surface of each of the laterals by including slots on the top surface.

17 Claims, 12 Drawing Sheets

LIQUID FILTER DEVICE

PRIORITY CLAIM

This application claims priority to U.S. Provisional Application Ser. No. 62/116,260, filed Feb. 13, 2015, which is incorporated herein by reference in its entirety.

TECHNICAL FIELD

This disclosure relates to filtration of liquid, and more particularly to liquid filter devices using a filter media.

RELATED ART

Liquid filter devices can be used to remove unwanted substances from liquids, such as water. Such devices can use mechanical or chemical processes to filter water. In an example water filter system, oxidation mechanical media may be used remove minerals from water such as iron, manganese, and/or hydrogen sulfide, or a water filter system may have an ion exchange type media that can remove minerals such as calcium and magnesium in a process referred to as "softening." The process by which minerals are removed by the water filter system can involve passing un-treated water, such as "hard" water, through a media bed to remove unwanted minerals to make, for example, soft water and/or water free of iron and sulfur.

SUMMARY

A liquid filter device can include a hub formed to receive a conduit; and a plurality laterals have a first end and a second end. The first end of the laterals coupled with the hub to form a structure positionable in a tank. Each of the laterals extending radially in different directions away from the hub such that the second ends are spaced away from the hub. Each of the laterals formed to include an internal cavity, the internal cavity formed with a first volume at the first end and a second volume between the first end and the second end, the second volume being larger than the first volume.

In another embodiment, a liquid filter device can include a conduit to receive and channel a flow of liquid, and a hub coupled with a first end of the conduit. The device can also include a plurality of laterals removeably coupled with the hub and extending radially in different directions away from the hub perpendicular to a central axis of the conduit. The conduit can be sized to extend the length of a tank such that a first end of the conduit is positioned at an opening formed in the tank, and the hub and laterals are positioned opposite the opening at a base of the tank and encompassed by a filtration media uniformly distributed in the tank to surround the laterals, the hub and at least part of the conduit.

In another embodiment, a liquid filter device includes a tank having an opening to an internal cavity formed in the tank, and a conduit disposed in the tank to receive and channel a flow of liquid between the opening in the tank and a bottom of the tank. The device can also include a hub sized to be received through the opening and coupled with the conduit. The hub is positionable near the bottom of the tank. The system can also include a plurality of laterals each individually sized to be received through the opening in the tank and slidably coupled with the hub to extend radially in different directions away from the hub and form a combined structure that cannot be received through the opening in the tank.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
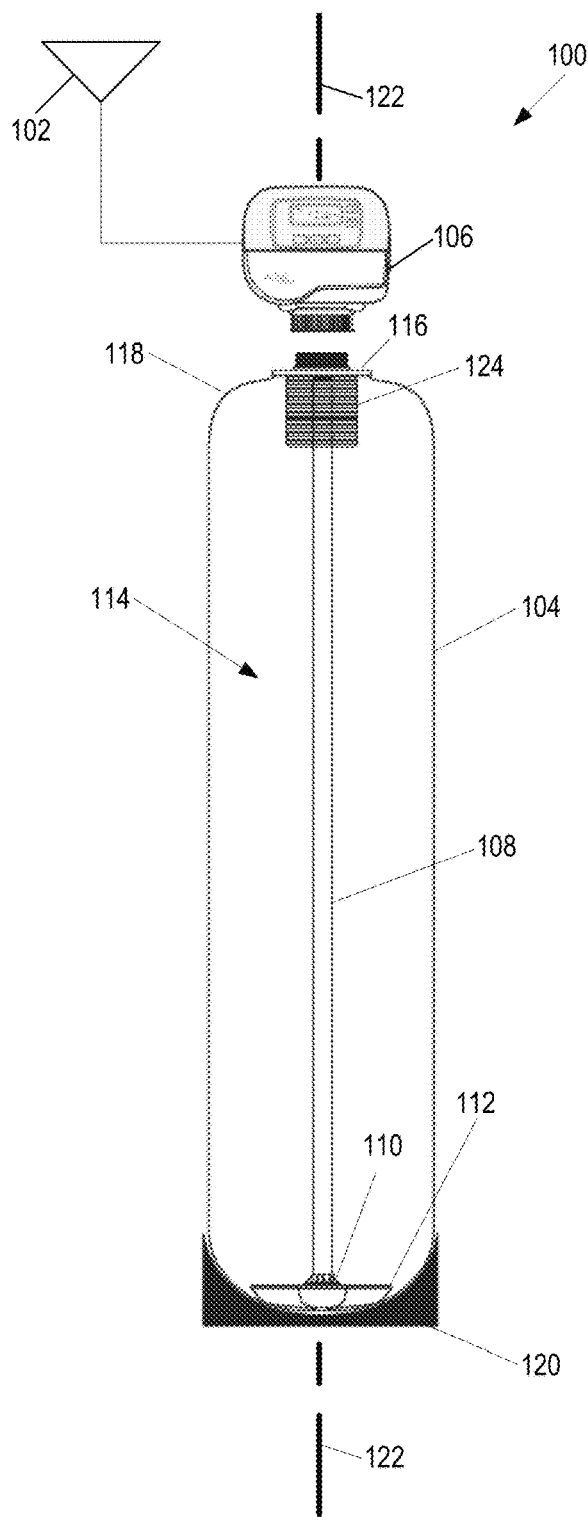
FIG. 1 is an example schematic of a liquid filter device.

FIG. 1 is an example schematic of a liquid filter device 100 in fluid communication with a source of liquid 102. The liquid filter device 100 may be used in any application where removal of material present in the liquid is desired. Examples of materials that can be removed from a liquid include elements and minerals such as iron, sulfur, calcium, magnesium, mercury, copper, lead or any other mineral; particulate; odor; and/or gases. For purposes of example, the liquid shall be referred to herein as water or liquid, and the device can be referred to as a water filter system or a liquid filter system, however, the liquid filter device can be used with any other liquid and should not be construed as being limited to use with only water. In an example, the source of liquid 102 can be a water source such as a well, ground water, a public water utility of any other source providing a flow of pressurized liquid to the liquid filter device 100. In other examples, any other source of liquid may be provided.

The liquid filter device 100 can include a tank 104, and a controller 106. In other examples, additional tanks and/or controllers may be used. In addition, in other examples, the liquid filter device 100 may include additional filter related components and/or stages of liquid treatment such that the illustrated tank 104 and/or controller 106 provide only a stage, or a portion of a stage, of processing of the liquid provided by the liquid source 102. The tank 104 can be a unitary structure made of fiberglass, plastic, metal, steel, aluminum, polyethylene liner wrapped in fiberglass, and/or any other rigid material. Alternatively, the tank 104 can be a multi-component structure that is coupled together to form the tank 104. In other examples, the tank 104 can be any other shape or configuration. Embodiments of the tank 104 can be formed as a generally cylindrical shape to include a diameter within the range of about 152.4 millimeters to about 609.6 millimeters and a length of about 508 millimeters to about 1828.8 millimeters from a generally concaved top end to a generally concaved bottom end of the tank 104. In an embodiment, the tank 104 has a diameter within a range of about 154 millimeters to about 604.6 millimeters and a length of about 1371.6 millimeters.

The controller 106 may include hardware such as valves, circuitry, and plumbing to fully operate and control at least a part of the liquid filter device 100. The circuitry can include a processor, memory, a user interface, servos, solenoids, and any other electrical, electro-mechanical, and/or hydraulic devices providing the functionality of a liquid filter device, including the functionality described herein.

The liquid filter device 100 can also include a conduit 108, a hub 110 and one or more laterals 112 positioned in a cavity 114 formed in the tank 104. The conduit 108 can be formed from any rigid material, such as plastic, that provides a channel for a flow of liquid. A proximate end of the conduit 108 can be coupled with the controller 106 and/or the liquid source 102, and may extend from an opening 116 formed in the tank 104, such as at the top 118 of the tank 104, through the cavity 114, to the bottom 120 of the tank 104. The hub 110 can be coupled with a distal end of the conduit 108, and be positioned near the bottom 120 of the tank 104. As described later, the conduit 108 can be disposed in the tank 104 to receive and channel a flow of liquid between the opening 116 in the tank 104 and the bottom 120 of the tank 104. The conduit 108 and the hub 110 can be sized to be received through the opening 116, and the hub 110 may be raised and lowered within the cavity 114 using the conduit 108.

The one or more laterals 112 can be each individually sized to be received through the opening 116 in the tank 104. In an example embodiment, the opening 116 may be about 100 millimeters, or about 155 millimeters. Once the hub 110 and the one or more laterals 112 are positioned in the cavity 114, the one or more laterals 112 can be slidably and detachably coupled with the hub 110 to extend radially in different directions away from the hub 110 and form a combined structure that cannot be received through the opening 116 in the tank 104. In an example embodiment, two or fewer of the laterals 112 may be coupled with the hub 110 to form a partial assembly that can pass through the opening 116 in the tank 104. In this embodiment, a partial assembly can be formed outside the tank 116 to include the hub 110 and no more than two of the laterals 112, whereas assemblies assembled outside the tank 104 that include the hub 110 coupled with more than two laterals will not fit through the opening 116 in the tank 104. An embodiment where the partial assembly that includes the hub 110 coupled with two or fewer of the laterals 112 is sized to fit through the opening 116 can be maneuvered through the opening 116 and may be temporarily maintained in a position in the cavity 114 just past the opening 116 so that a user can insert the remaining one or more laterals 112 through the opening 116, and maneuver the partial assembly and the one or more laterals 112 manually to accomplish the coupling of the hub 110 included in the partial assembly with the remaining laterals 112 to form the combined structure. For example, each of the one or more laterals 112 may be positioned to extend perpendicularly away from a central axis 122 of the conduit 108 and be slid in a direction parallel to the central axis 122 to fixedly couple the respective lateral 112 with the hub 110. In alternative embodiments, the partial assembly that fits through the opening 116 may be the hub 110 coupled with only one lateral 112.

After the one or more laterals 112 are interlocked with the hub 110, the combined structure may be lowered into position at the bottom 120 of the tank 104 using the conduit 108. Once the combined structure is positioned, the proximate end of the conduit 108 can be positioned proximate the opening 116 and fixedly coupled with the controller 106 using a coupling mechanism 124 such as a collar, a valve, or some other coupling mechanism. The combined structure of the hub 110 and the one or more laterals 112 may be held in position against an interior surface of the tank 104 that defines the bottom of the cavity 114 by a force applied with the conduit 108 toward the bottom 120 of the tank 104. In other examples, the interior surface of the tank 104 can be a formed to receive or engage the combined structure and/or the combined structure may be held in position above the interior surface at the bottom 120 of the tank 104. The one or more laterals 112 may extend outwardly to be adjacent the interior surface of the tank 104 forming the sidewalls of the cavity 114. The one or more laterals 112 may engage and/or contact the sidewalls in some example embodiments.

Figure 2:
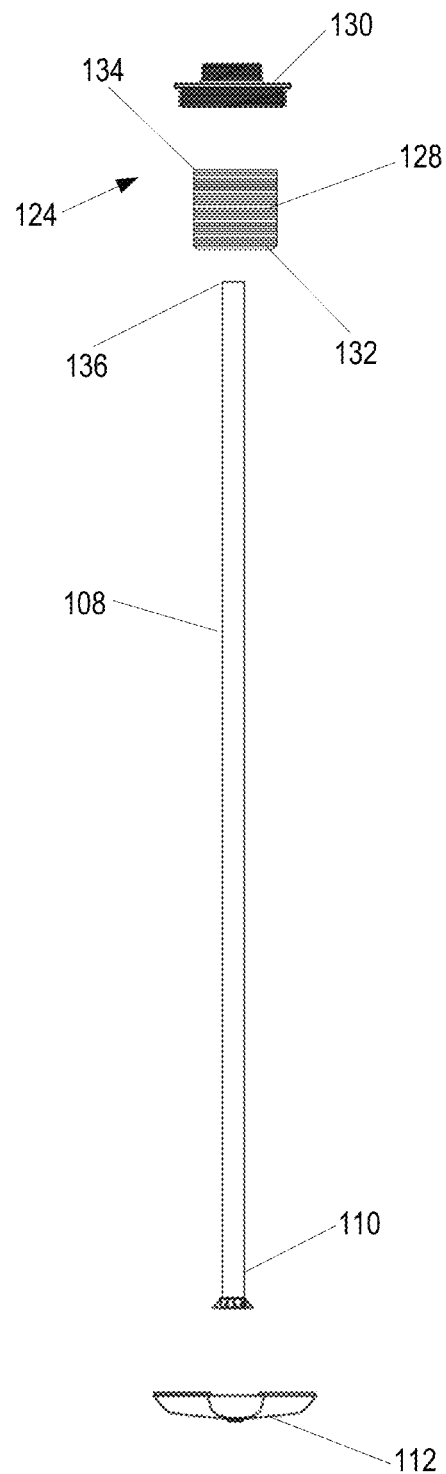
FIG. 2 is an example exploded view of a portion of a liquid filter device.

FIG. 2 is an example exploded view schematic illustrating example embodiments of the conduit 108 coupled with the hub 110, the one or more laterals 112, and the coupling mechanism 124. In the embodiment of FIG. 2, the coupling mechanism 124 includes a diffuser 128 and a pilot 130. In this embodiment, the diffuser 128 is a threaded cone formed of a rigid material such as plastic, which is formed with a central aperture through which the conduit 108 may extend. A first end 132 of the diffuser 128 may be received in the opening 116, which may also be threaded, and rotatably coupled with the opening 116 in the tank 104 by threaded coupling. (FIG. 1) Alternatively, another coupling mechanism, such as welding, gluing, compression fittings, a bayonet locking system, a snap fit, or any other coupling method or apparatus may be used to rigidly couple the diffuser 128 to the tank 104. A second end 134 of the diffuser 128 may also be coupled by threaded coupling with the pilot adapter 130. Alternatively, another coupling mechanism, such as welding, gluing, compression fittings, a bayonet locking system, a snap fit, or any other coupling method or apparatus may be used to rigidly couple the diffuser 128 to the pilot adapter 130. The pilot adapter 130 may engage the proximate end 136 of the conduit 108 and form a liquid tight connection by friction fit, gluing, ultrasonic welding, or some other rigid coupling mechanism. Upon the diffuser 128 and the pilot attribute 130 being threadedly coupled together and to the tank 104, the hub 110 and/or the one or more laterals 112 may rest against one or more interior surfaces at the bottom 120 of the tank 104.

Figure 3:
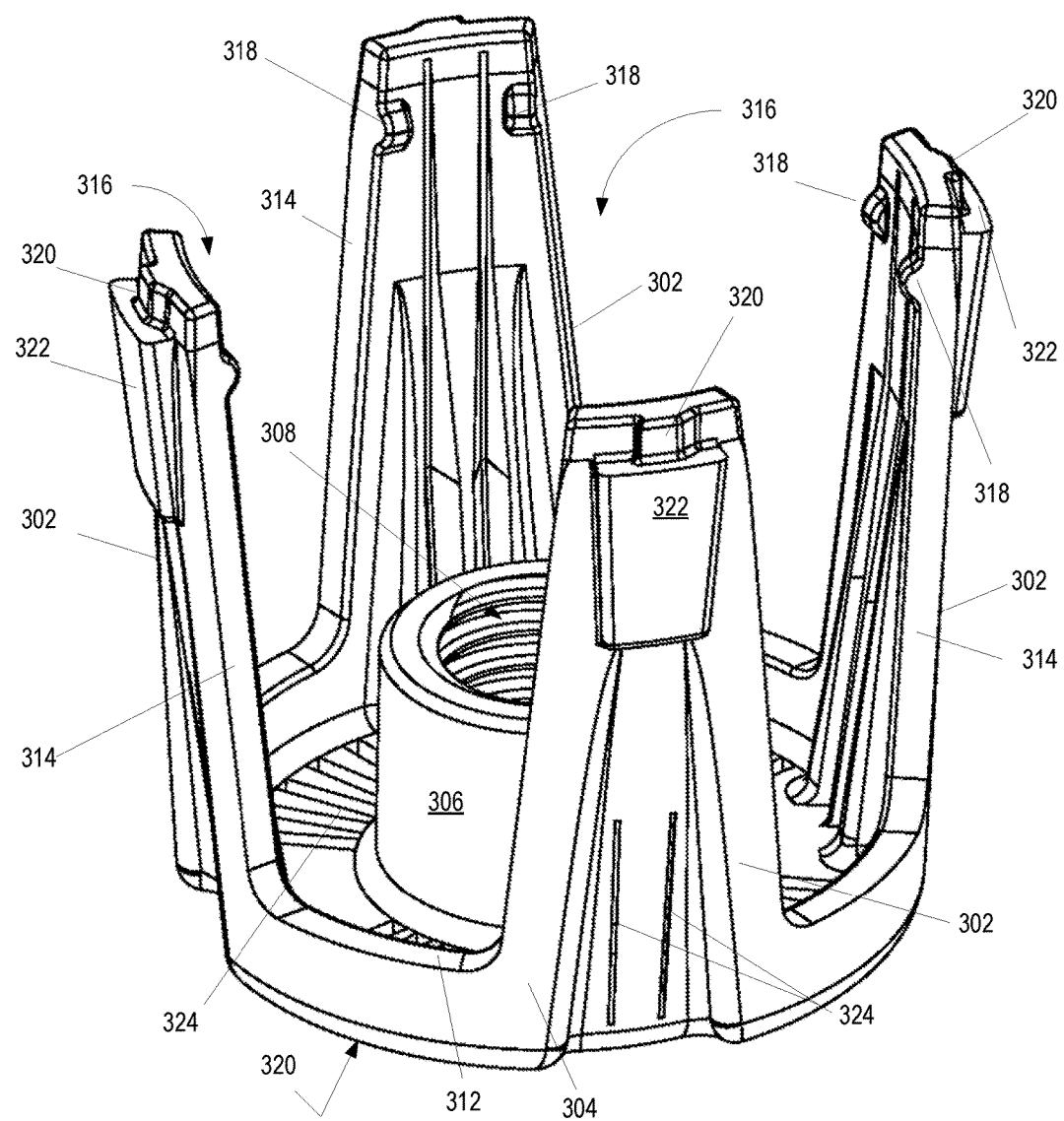
FIG. 3 is an example perspective view of at least a portion of a hub included in a liquid filter device.

FIG. 3 is an example embodiment of at least a portion of a hub 110 formed to include a number of members 302 extending away from a base 304. The hub 110 may be formed of plastic, metal or any other rigid material. The base 304 can include a socket 306 concentrically positioned in the base 304 and formed to include an aperture 308. In an embodiment, the aperture 308 may be designed to be aligned and fixedly engaged with the conduit 108. Alternatively, a conduit pilot, as described later, can operate as part of the hub 110 to couple the illustrated portion of the hub 110 to the conduit 108. In the illustrated embodiment, the aperture 308 may be formed to be threaded in order to engage with a threaded member, such as the distal end of the conduit 108 (which can also be threaded in some embodiments), or a conduit pilot.

In FIG. 3, the members 302 may extend from the base 304 in the same direction the conduit 108 extends from the base 304. A shoulder 312 forming a peripheral edge of the base 304, and a rail 314 formed along a peripheral edge of each of the members 302 may cooperatively operate with the shoulder 312 to form a slot 316. Each of the slots 316 formed between the members 302 may be dimensioned to receive and engage a respective one of the laterals 112, which can be slidably coupled with the hub 110 by engagement with the rails 314. The laterals 112 can be slid down the rails 314 until reaching the shoulder 312, such that keepers 318 included on each of the members 302 may engage the respective laterals 112 and can fixedly maintain the laterals 112 resting against the shoulders 312.

The laterals 112 may also be fixedly held in the slots 316 by a coupling mechanism that engages ears 320 included on each of the members 302, while also engaging ribs 322 formed on the members 302, as described later. The positioning of the combined structure resting against the interior wall at the bottom 120 of the tank 104 may also provide support to fixedly hold the laterals 112 in the hub 110. Each of the members 302 may also include one or more aperatures, such as slots or holes 324 (hereinafter described as slots 324) to allow liquid communication between the sides of the outside of the hub 110 and an interior of the hub 110 when the laterals 312 are installed. In addition, the base 304 may include slots 324 providing liquid communication from outside a bottom surface 326 of the base 304 and the socket 306. The slots 324 may be dimensioned to allow the passage of liquid, such as water, therethrough, while denying passage of other materials, such as the filter media.

Figure 4:
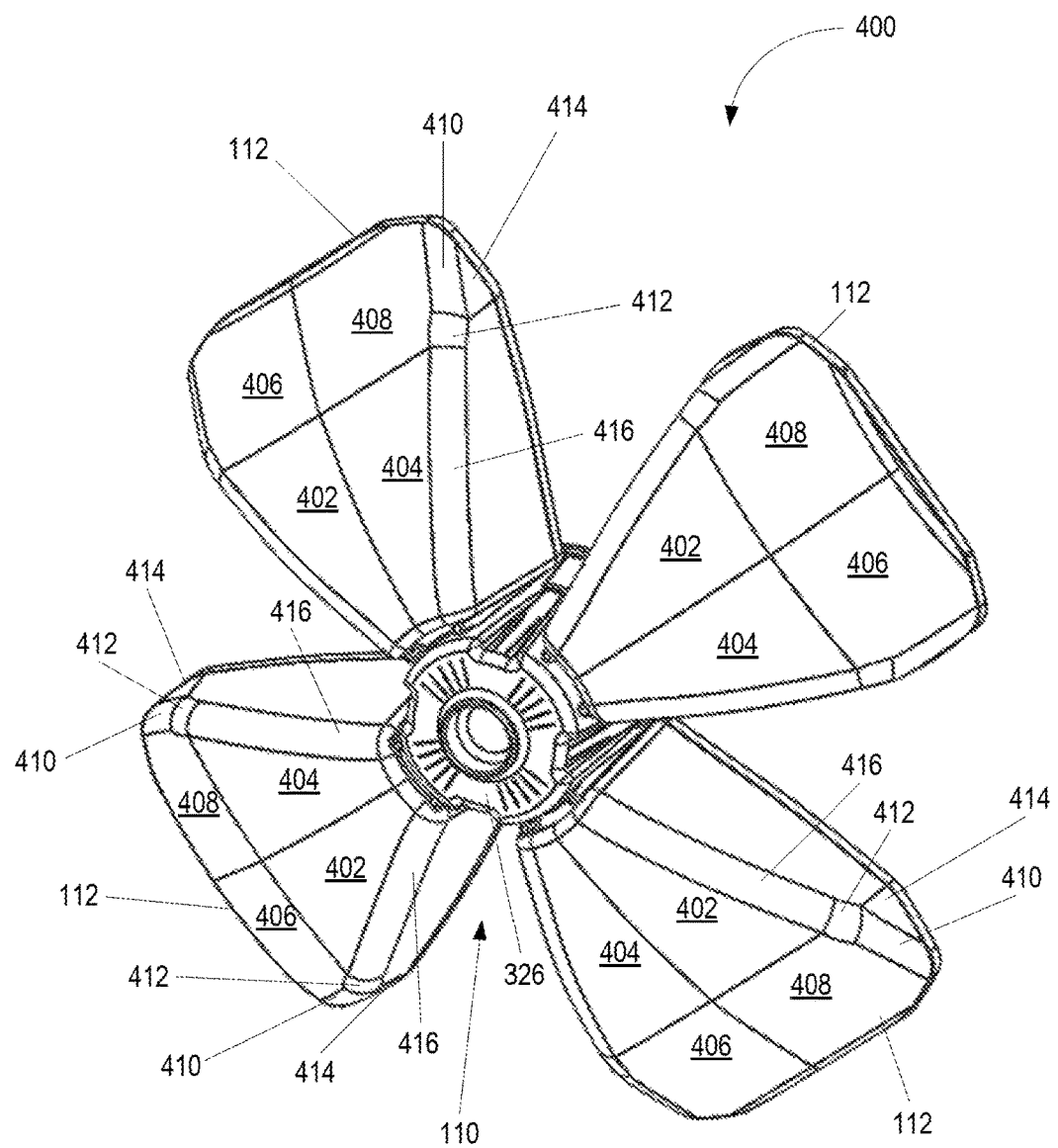
FIG. 4 is an example perspective view of a combined structure included in a liquid filter device.

FIG. 4 is a perspective bottom view of an example embodiment of a combined structure 400, that includes the hub 110 coupled with four laterals 112. In this illustrated example, the laterals 112 are fully engaged in the slots 316 such that each of the laterals 112 are butted against the shoulders 312 and uniformly distributed around the hub 110. Each of the laterals 112 include facets forming a bottom surface of the respective laterals 112. Each of the facets can be substantially flat planar surfaces extending to other contiguously positioned facets. In FIG. 4, first and second facets 402 and 404 are substantially aligned in a same plane with the bottom surface 326 and extend away from the hub 110 with increasing surface area due to the wedge shaped configuration of the example laterals 112.

Figure 5:
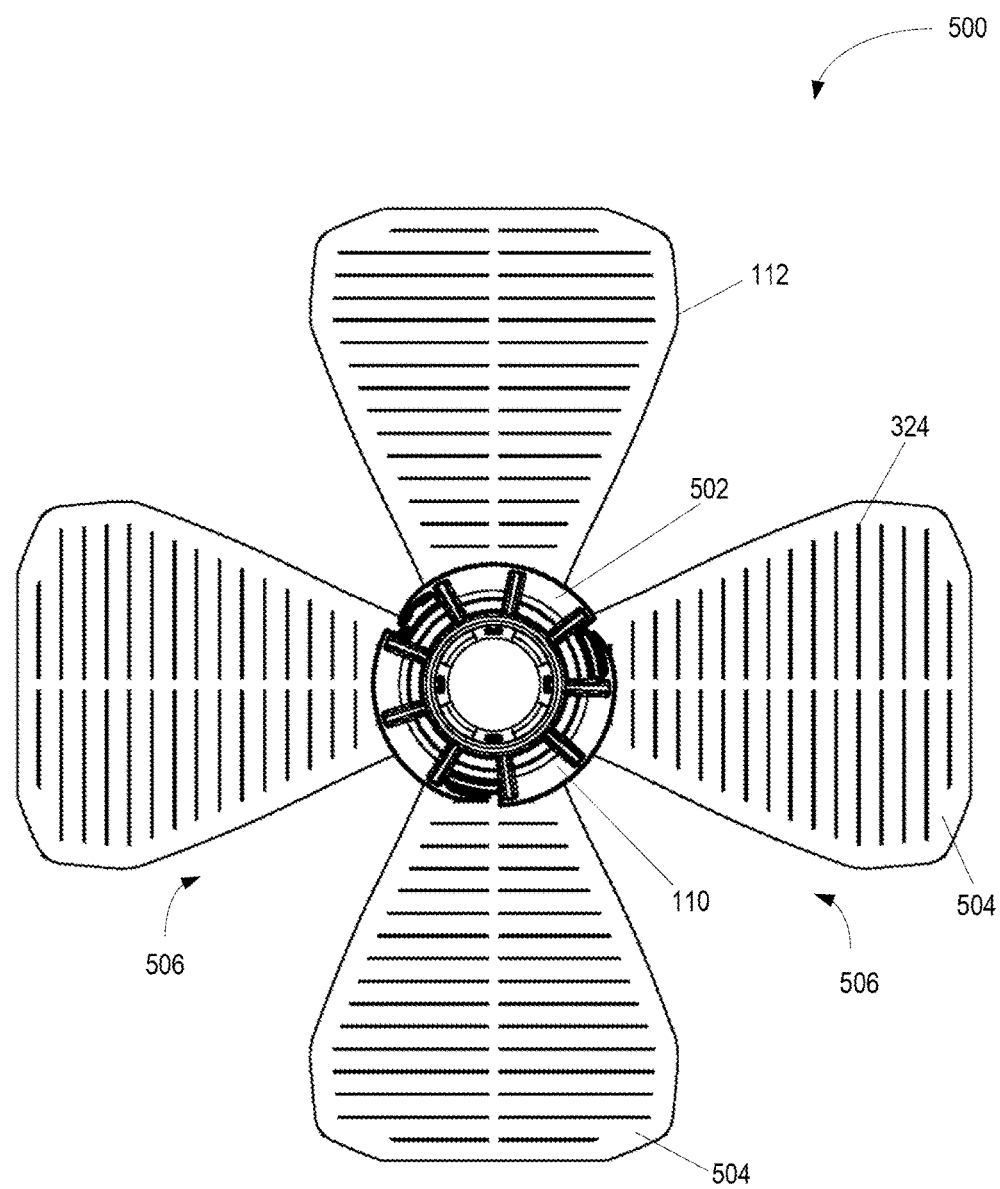
FIG. 5 is a top view of an example combined structure included in a liquid filter device.

The first and second facets 402 and 404 are substantially aligned with the bottom surface of the hub 110, but are also formed to slope upwardly in order to also align with the contoured interior surface of the bottom 120 of the tank 104, which can be generally concaved to form a dome shape. Accordingly, third and fourth facets 406 and 408 have a larger slope than facets 402 and 404 in order to substantially align with the contoured bottom interior surface of the tank 104. Also, facets 410, 412, 414 and 416 of the laterals 112 are sloped to form a substantially arcuate shape in order to substantially align with the contour of the interior side walls of the tank 104, as also illustrated in FIG. 5. The alignment of the slope of the facets 402, 404, 406, 408, 410, 412, 414, and 416 to be substantially parallel with the contour of the interior bottom and side walls of the tank 104 allows granules of filter media to be displaced from the location under the laterals 112 during a backwash, as described later, and also allows the flow of liquid through any filter media disposed between the facets 402, 404, 406, 408, 410, 412, 414, and 416 of the lateral 112 and the interior bottom and side walls of the tank 104.

In example configurations, a surface of any one or more of the facets 402, 404, 406, 408, 410, 412, 414, and 416 may include apertures, such as slots or holes (hereinafter described as slots) that provide liquid communication between an interior of the respective lateral 112 and liquid present in the interior of a tank 104. The slots may be uniformly sized and oriented or of varying size and orientation. A predetermined number of slots may be formed in one or more of the facets 402, 404, 406, 408, 410, 412, 414, and 416 at predetermined locations to form a pattern. For example, where the slots formed with a predetermined width that is less than a predetermined length, the slots may be align longitudinally in one or more rows extending outwardly from the hub 110. Alternatively, or in addition, the slots can be longitudinally aligned to extend in perpendicular rows across the facets 402, 404, 406, 408, 410, 412, 414, and 416, similar to the discussion and description of FIG. 5. As discussed, elsewhere, the size and configuration of the slots can be advantageously provided to create inactive zones and/or active zones that enable displacement of granules of filter media from locations surrounding the laterals 112 within the tank 104 during a backwash cycle.

FIG. 5 is a top view of an example embodiment of a combined structure 500 that includes example embodiments of the hub 110 and the laterals 112. In this example embodiment, the hub 110 can include a conduit pilot mechanism 502 or conduit pilot. The conduit pilot mechanism 502 may be plastic or some other rigid material. In some embodiments, the conduit pilot mechanism 502 can be inserted into the hub 110 to rotatably engage with the socket 306. (FIG. 3) In alternative embodiments, the conduit pilot mechanism can be snap fit, such as with a bayonet and/or a locking tab to engage with the hub. In addition, the conduit pilot mechanism 502 can be fixedly coupled with the conduit 108. (FIG. 2) Thus, in embodiments the conduit pilot mechanism 502 can be coupled with the hub 110 by engaging the socket 306, using the conduit 108 to rotate, push, twist, pull or otherwise manipulate the hub 110 with respect to the socket 306 to thereby maneuver the conduit pilot mechanism 502 into a fixedly coupled relationship with the socket 306. In other embodiments, the conduit pilot mechanism 502 can be omitted, and the conduit 108 can engage the socket 306 and include functionality similar to the conduit pilot mechanism 502.

Referring to FIGS. 1 and 5, the laterals 112, can include a surface 504 facing toward the top 118 of the tank 104 when the combined structure 500 is assembled and installed. The area in the cavity 114 of the tank 104 above each of the surfaces 504 of the respective laterals 112 can be considered active zones during a backwash cycle as described later. The dimensions of the area of the active zones can be based on the corresponding surface area of the surface 504. In FIG. 5, each of surfaces 504 of the laterals 112 can be generally wedge shaped such that the area of the surface 504, and the corresponding active zone above each of the surfaces 504 increases as the lateral 112 extends away from the hub 110. Although the surface 504 is illustrated as being substantially flat in FIG. 5, the surface 504 can also have one or more facets, with varying slopes, or be concave or convex in other embodiments.

Each of the laterals 112 can be spaced away from each other a predetermined distance to create areas 506 of the cavity 114 in the tank 104 described as inactive zones, positioned between active zones. As described later, during a backwash cycle, filter media in the inactive zones may be moving in a first direction toward the bottom 120 of the tank 104, whereas filter media in the active zones may be moved by a flow of liquid in a second direction (opposite the first direction) toward the top 118 of the tank 104.

Movement of the filter media toward the top 118 of the tank 104 may be due to pressurized liquid, such as water, being emitted from one or more apertures, such as slots or holes 324 (hereinafter described as slots 324) that are formed in the surfaces 504. Similar to the previously discussed slots in the facets 402, 404, 406, 408, 410, 412, 414, and 416, the slots 324 provide liquid communication between an internal cavity of the respective lateral 112 and areas in the cavity 114 of the tank 104 considered to be active zones. The slots 324 may be dimensioned to allow the passage of liquid therethrough, while denying passage of the filter media. The number, size, and location of the slots 324 may vary in different embodiments, in order to provide the passage of liquid through the slots 324 and create active zones, which can be separated by inactive zones between the laterals 112. In addition, the slots 324 may be uniformly sized and positioned, and/or non-uniformly sized and positioned in different examples to create the active zones.

Figure 6:
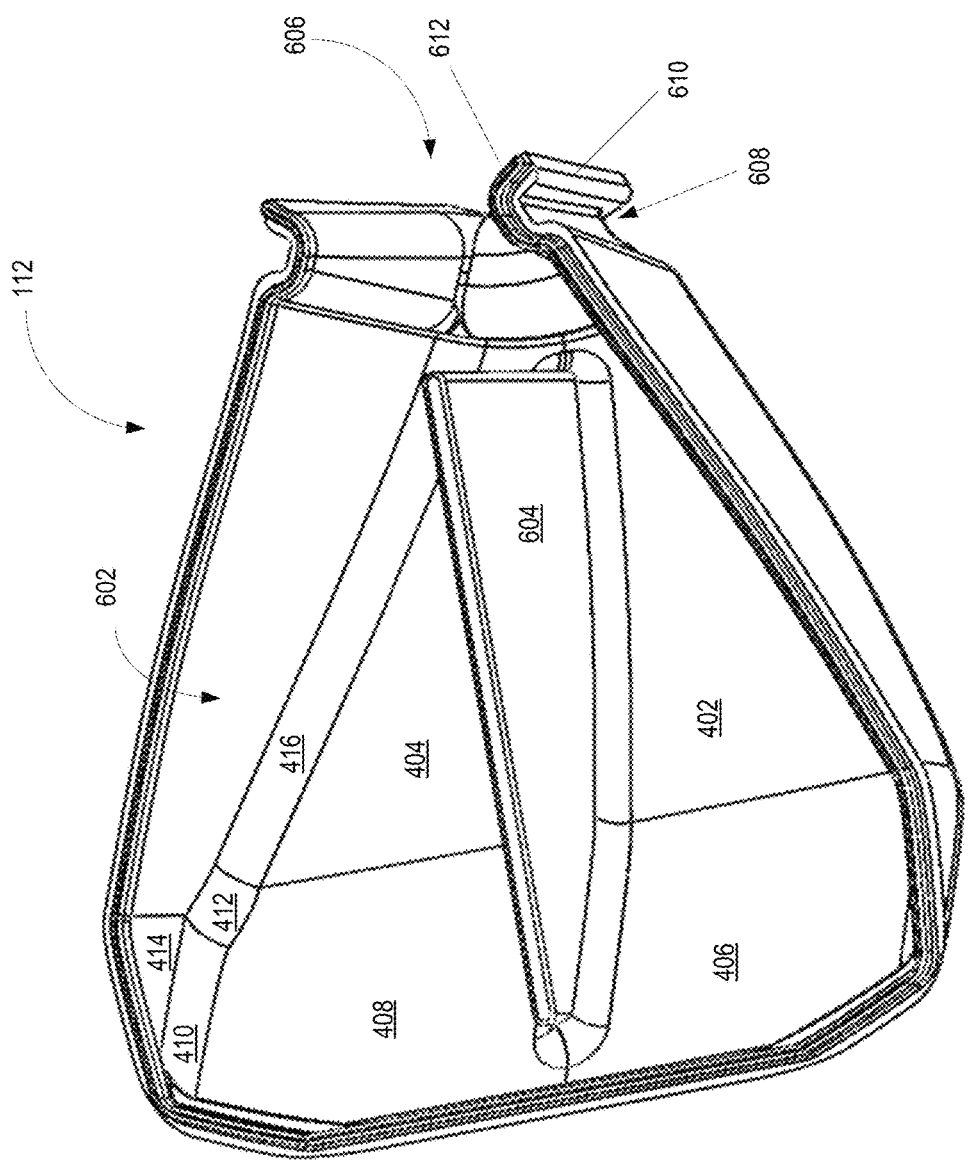
FIG. 6 is perspective view of an example lateral included in a liquid filter device.

FIG. 6 is a perspective view of an example embodiment of a lateral 112 with the surface 504 removed. The bottom of the lateral 112 may include the facets 402, 404, 406, 408, 410, 412, 414, and 416 in order to substantially contour the bottom of the lateral 112 to the bottom and side interior surfaces of the tank 104. A chamber 602 formed in the lateral 112 may allow a path for the flow of liquid (ingress/egress) through the slots 324 included in the hub 110, in the surface 504 of the lateral 112 and/or in the surface of the facets 402, 404, 406, 408, 410, 412, 414, and 416. The flow of liquid may also be controlled by a blade 604 to be uniformly distributed to the slots 324 via the chamber 602 during a backwash cycle. The laterals 112 may also include a duct 606 formed as part of the chamber 602 in order to couple the lateral 112 to the hub 110 and provide liquid communication between the interior of the hub 110 and the chamber 602. In the illustrated embodiment, the duct 606 is at a proximate end of the lateral 112, and forms the smallest volume of the chamber 602. The volume of the chamber 602 becomes larger towards a distal end of the lateral 112, which extends away from the hub 110. In an example embodiment, the internal chamber 602 can be formed with a first volume at the first end of lateral 112 in the duct 606, and a second volume that progressively increases between the first end and the second end of the lateral 112. The second volume can be larger than the first volume.

The lateral 112 can also include a coupling mechanism, or latching mechanism, for coupling the lateral 112 to the hub 110. Referring to FIGS. 2 and 6, the illustrated lateral 112 includes a coupling mechanism in the form of a slot 608 and a rail 610 which are formed to slidably engage with the rails 314 included in the hub 110 and/or the shoulder 312 included on the base 304 of the hub 110. An upper edge 612 of the coupling mechanism can be formed to engage the keeper 318 included on the hub 110 and fixedly maintain the hub 110 and the lateral 112 in the combined structure configuration. The laterals 112 may also be maintained in a coupled configuration with the conduit pilot mechanism 502.

Figure 7:
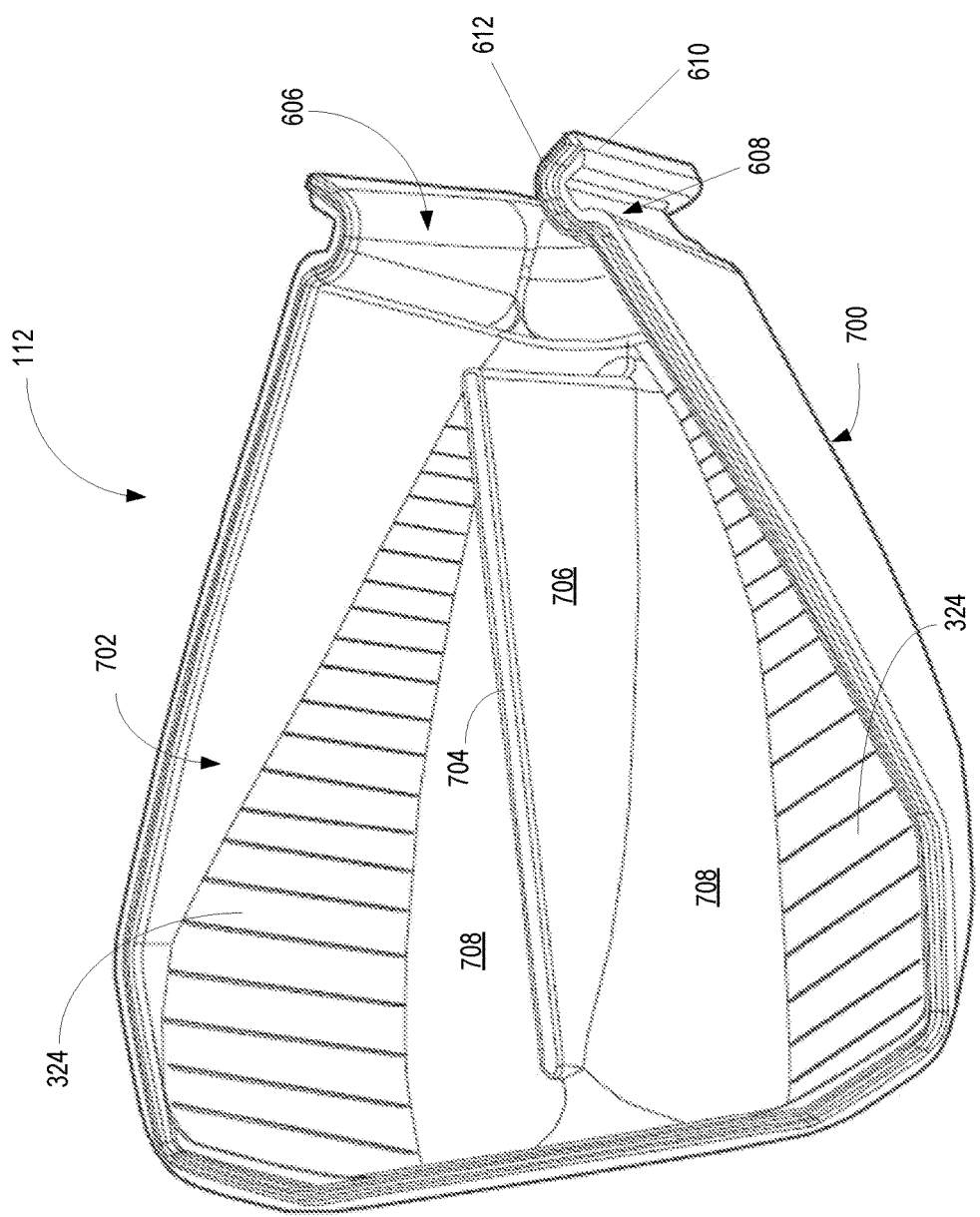
FIG. 7 is another perspective view of an example lateral included in a liquid filter device.

FIG. 7 is a perspective view of another example embodiment of a lateral 112 with the top surface 504 removed. A bottom surface 700 of the lateral 112 may be formed with a convex shape in order to substantially contour the bottom surface 700 of the lateral 112 to the bottom and side interior surfaces of the tank 104, as illustrated. In this embodiment, the bottom surface 700 of the lateral 112 may include a substantially continuously curved surface, instead of the substantially planar facets, which were described with respect to the embodiment of FIG. 6. Thus, the lateral 112 may form a generally wedge shape that tapers as the lateral 112 extends away from the hub 110. In other example embodiments, the bottom surface 700 of the lateral 112 may include facets, similar to those illustrated in FIG. 6.

The bottom surface 700 of the lateral 112 of FIG. 7 may include slots 324. Similar to the previously discussed examples, the bottom surface 700 can include a predetermined number and configuration of slots 324 of uniform size and orientation, and/or varying sizes and non-uniform orientations. The slots 324 included in the bottom of the lateral 112 can allow liquid communication into and out of a chamber 702 formed in the lateral 112. Thus, a path for the flow of liquid can be not only through the slots 324 in the bottom surface of the lateral 112, but also through the top surface 504 (FIG. 5) of the lateral 112. The slots 324 included in both the top and bottom surfaces of the lateral 112 provides agitation of filter media external to the lateral 112 both above and below the lateral 112 using the flow of liquid, such as during a backwash cycle. Accordingly, in example configurations, filter media both above and below the lateral 112, but not to the sides of the lateral 112, may be subject to the flow of liquid in both the filter mode, and in the backwash mode. Thus, liquid flowing out of the slots 324 in the top and bottom surfaces of the lateral 112 may form the active zone during the backwash mode.

The flow of liquid may also be channeled by a blade 704 to be uniformly distributed to (or from) the slots 324 in the top and bottom surface of the lateral 112. The blade 702 may include a keel 704 that is positioned substantially perpendicular to the bottom surface 700 of the lateral 112 and extends to the top surface 504. In addition, the blade 702 may include a beveled surface 706 formed as a sloping transition from the substantially perpendicular keel 704 to the curved bottom surface 700 of the lateral 112. Due to the curved bottom surface 700 of the lateral 112 being sloped to substantially match the contour of the tank 104, the beveled surface 706 may extend further from the keel 704 as the lateral 112 slopes upwardly toward a distal end of the lateral 112. The lateral 112 may also include the duct 606 formed at a proximate end of the lateral 112 as part of the chamber 702 in order to couple the lateral 112 to the hub 110 and provide liquid communication between the interior of the hub 110 and the chamber 702. In this illustrated embodiment, the duct 606 is at the proximate end of the lateral 112, and forms the smallest volume of the chamber 702. The volume of the chamber 702 becomes larger towards a distal end of the lateral 112, which extends away from the hub 110. Thus, in this example embodiment, the internal chamber 702 can be formed with a first volume at the first end of lateral 112 in the duct 606, and a second volume that progressively increases between the first end and the second end of the lateral 112. The second volume can be larger than the first volume.

The lateral 112 can also include a coupling mechanism for coupling the lateral 112 to the hub 110. Referring to FIGS. 2 and 6, the illustrated lateral 112 includes a coupling mechanism in the form of the slot 608 and the rail 610 which are formed to slidably engage with the rails 314 included in the hub 110 and/or the shoulder 312 included on the base 304 of the hub 110. An upper edge 612 of the coupling mechanism can be formed to engage the keeper 318 included on the hub 110 and fixedly maintain the hub 110 and the lateral 112 in the combined structure configuration. The laterals 112 may also be maintained in a coupled configuration with the conduit pilot mechanism 502.

Figure 8:
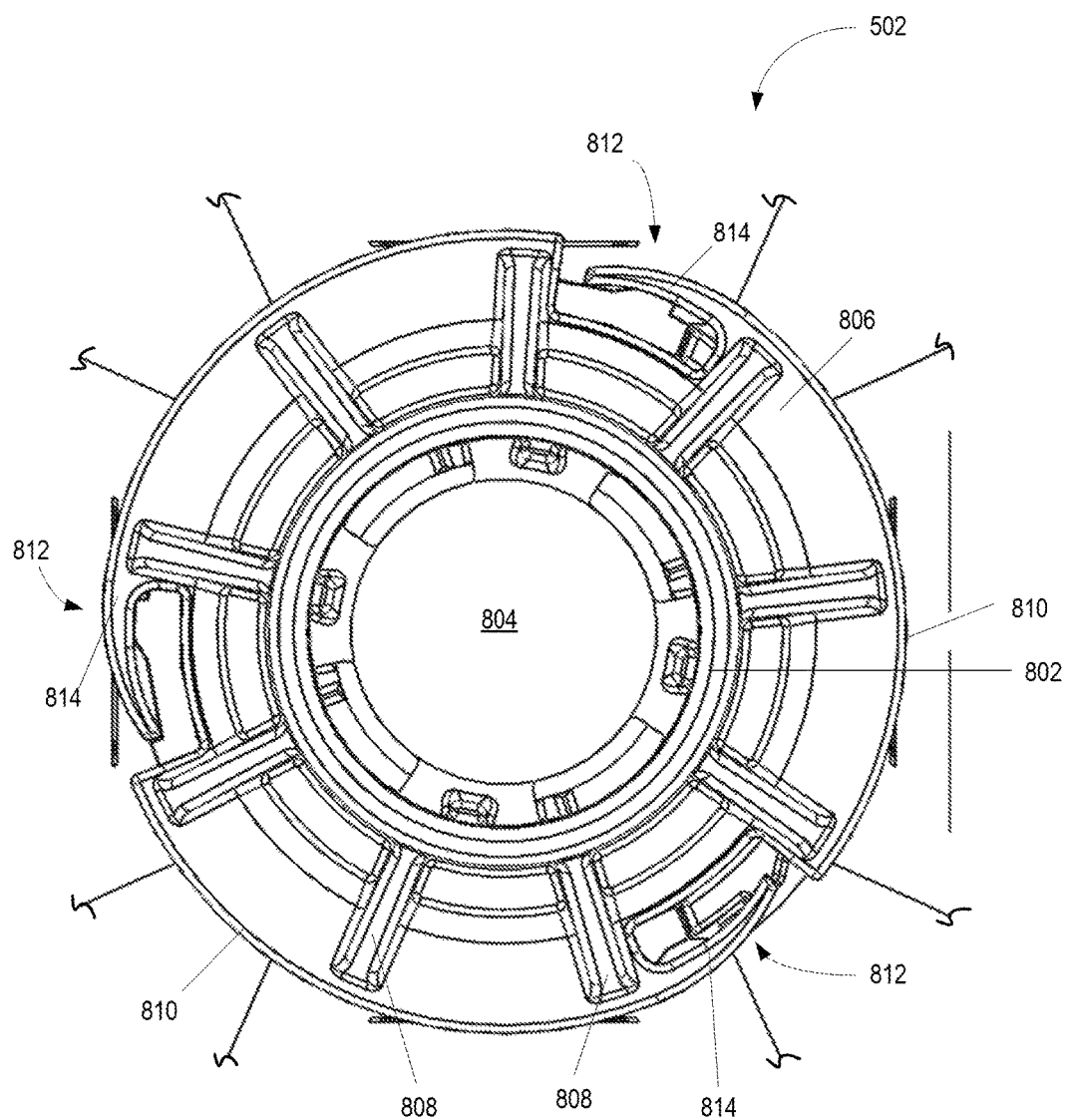
FIG. 8 is a top view of an example of a portion of a hub included in a liquid filter device.

FIG. 8 is a partial top view of an example embodiment of the combined structure 500 depicting the conduit pilot mechanism 502. The conduit pilot mechanism 502 may be formed to include a cylindrical member 802 forming a central aperture 804 dimensioned to receive the conduit 108. The conduit 108 may be glued, ultrasonically welded, friction fitted, and/or otherwise fixedly coupled with the conduit pilot mechanism 502. A surrounding shelf 806 may be fixedly coupled with the cylindrical member 802 by struts 808 and extend as a planar surface radially away from the cylindrical member 802. The planar surface of the shelf 806 includes a top surface coupled with the struts 808 and an opposing bottom planar surface facing the hub 110 when the conduit pilot mechanism 502 is engaged with the hub 110.

In an embodiment, the shelf 806 may be formed to include a surrounding skirt 810 at a peripheral outer edge of the shelf 806. The skirt 810 extends perpendicular to the planar surface of the shelf 806 away from the bottom planar surface of the shelf 806 toward the hub 110. Referring to FIGS. 2 and 8, the skirt 810 surrounding the shelf 806 may be formed to include clasps 812. Each of the clasps 812 can include a deflectable finger 814 formed with a portion of the skirt 810, which can be deflected outwardly by the ears 320 included on the hub 110 as the conduit pilot mechanism 502 is rotatably engaged with the hub 110. In addition, the bottom planar surface of the shelf 806 aligns contiguously with the distal ends of the members 302 of the hub 110 as the conduit pilot mechanism 502 is rotatably engaged with the hub 110. The deflectable fingers 814 may be coupled to the shelf 806 at a proximate end, and extend away from the shelf 806 so that a distal end of the fingers 814 slidably engages the ears 320 thereby forming a latch. As the conduit pilot mechanism 502 is rotatably engaged with the hub 110, the distal end of fingers 814 flexibly bend outwardly in order to selectively engage the ears 320 on hub 110.

Figure 9:
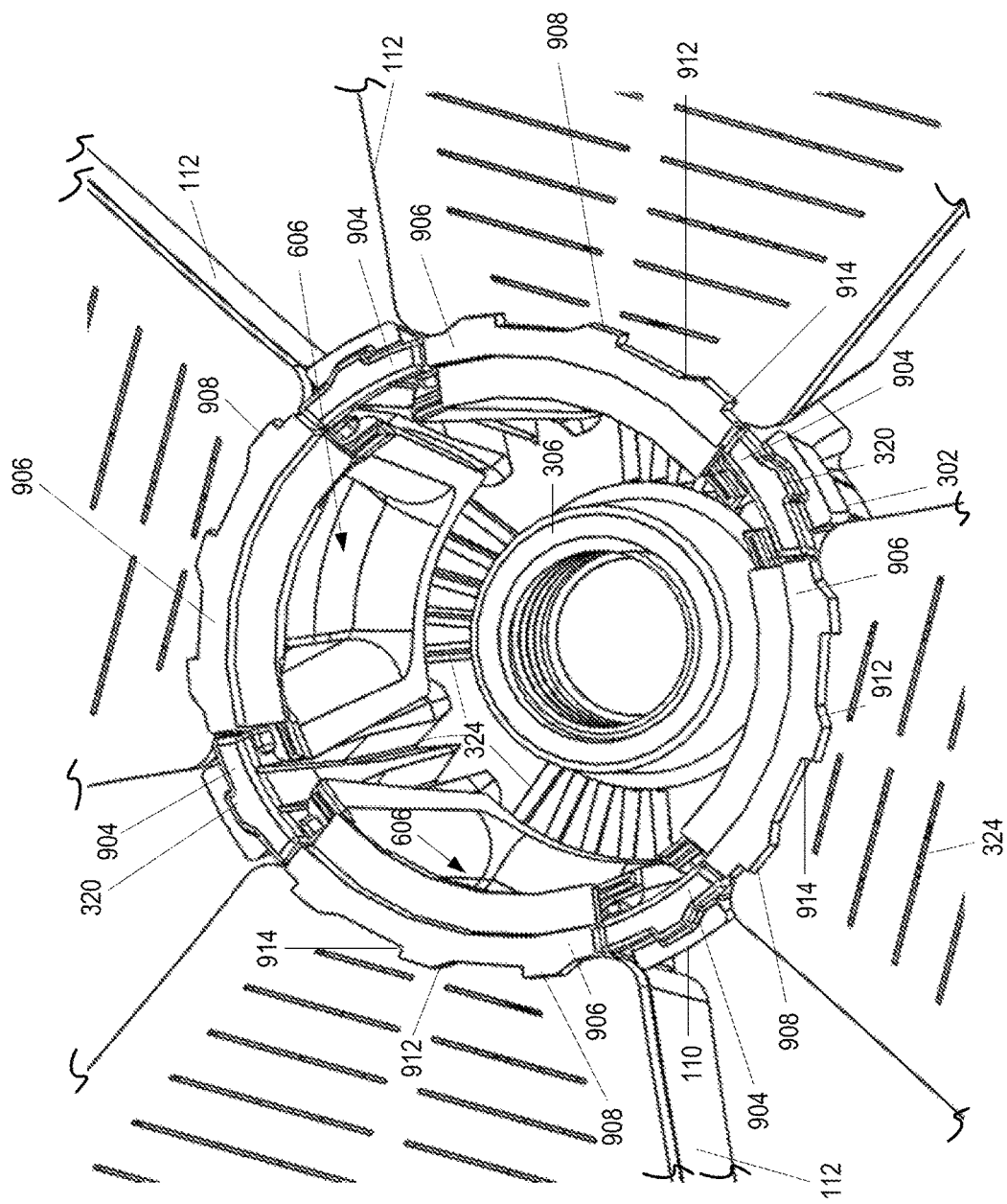
FIG. 9 is a perspective view of a portion of an example of a combined structure included in a liquid filter device.

FIG. 9 is another partial top view of an example embodiment of the combined structure 500 depicting the hub 110 engaged with laterals 112, with the conduit pilot mechanism 502 removed to illustrate a passageway formed in the combined structure 500 from the hub 110, and the ducts 606 in each of the laterals 112. The socket 306, with which the conduit pilot mechanism 502 can be rotatably coupled, extends into the passageway. The passageway can provide a flow of liquid between the laterals 112 and the conduit 108. Liquid can flow from the laterals 112 to the conduit 108 during filteration, or from the conduit 108 to the laterals 112 during backwash.

Each of the members 302 of the hub 110 include the ears 320 to detachably engage the fingers 812, when the conduit pilot mechanism 502 is rotatably coupled with the hub 110 such that the planar surface of the shelf 806 is contiguously aligned with a distal end 904 of the members 302. In addition, the planar surface of the shelf 806 may be contiguously aligned with the laterals 112 upon being contiguously aligned with the distal end 904 of the members 302. In the illustrated embodiment, each of the laterals 112 include a rail 906. Each of the rails 906 include ears 908, which are formed on the rails 906 to engage the deflectable fingers 814 of the clasps 812 when the conduit pilot mechanism 502 is rotatably engaged with the socket 306.

The ears 320 and 908 can include a slanted surface 912 and a transverse surface 914. The slanted surface 912 can deflect the fingers 812 outwardly as the conduit pilot mechanism 502 is rotatably engaged with the socket 306. The fingers 812 are formed of a flexible material with memory to return the distal end of the fingers 812 to a resting position substantially aligned with the skirt 810. Thus, as the conduit pilot mechanism 502 is rotatably engaged with the socket 306, and the distal end of the fingers 812 reach the transverse surface 914, the fingers 812 snap inwardly such that the transverse surface 914 is operable as a detent to inhibit rotation of the conduit pilot mechanism 502 in the opposite direction. Thus, when the conduit pilot mechanism 502 is fully rotatably engaged with the socket 306, the fingers 812 operate as pinions to fixedly maintain the engagement between the conduit pilot mechanism 502 and the hub 110 by restraining counter-rotation of the conduit pilot mechanism 502.

Figure 10:
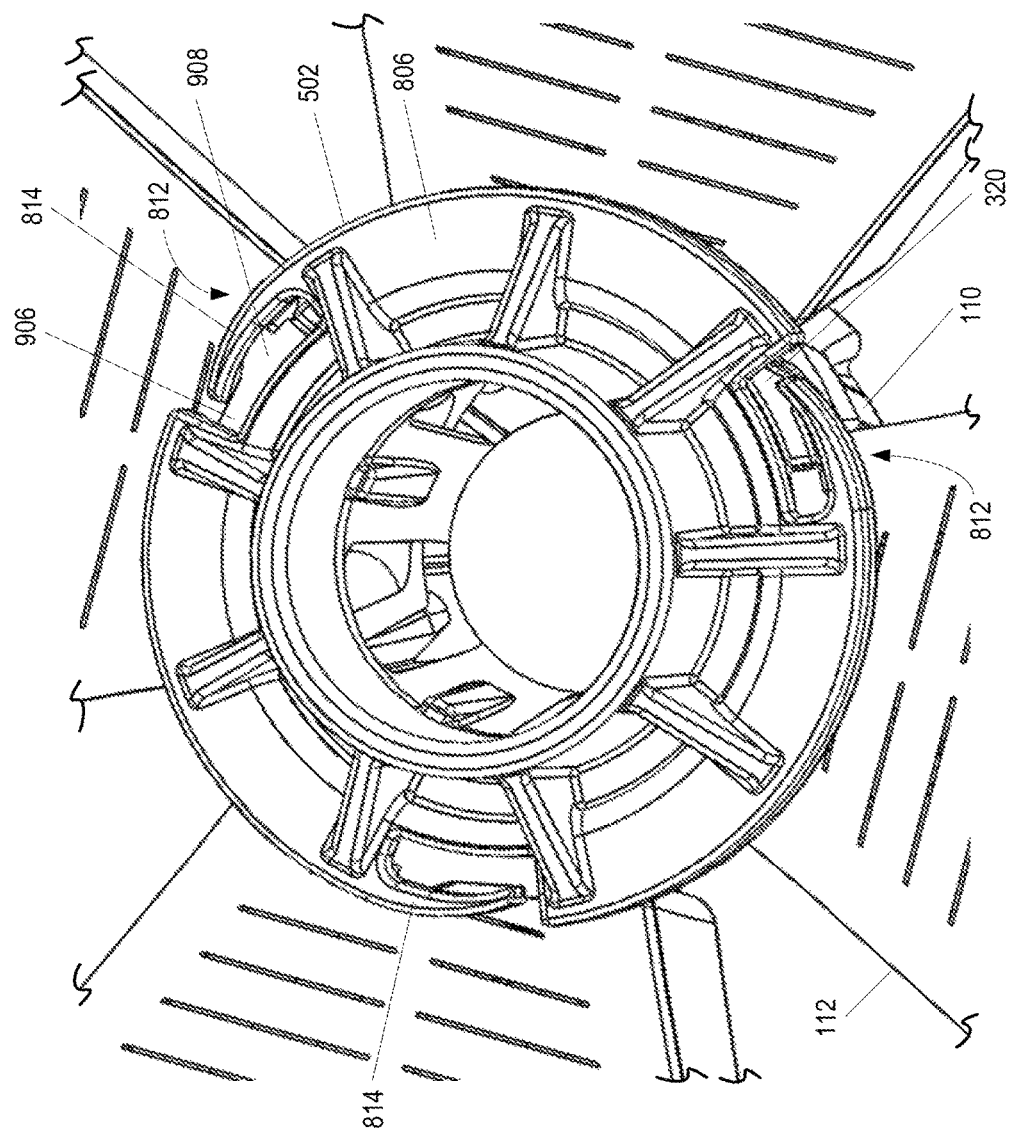
FIG. 10 is another perspective view of a portion of an example of a combined structure included in a liquid filter device.

FIG. 10 is a perspective view of an example embodiment of the combined structure 500 depicting the hub 110 engaged with laterals 112, and with the conduit pilot mechanism 502 rotatably engaged with the hub 110. Referring to FIGS. 9 and 10, at least some of the clasps 812 included in the surrounding shelf 806 are illustrated as engaged with the ears 320 and 908 included on members 302 of the hub 110, and the rails 906 of the laterals 112, respectively. Thus, the rotational positioning of the conduit pilot mechanism 502 with respect to the laterals 112 and the hub 110 when the conduit pilot mechanism 502 is fully engaged with the socket 306 can be any rotational position, while still allowing the fingers 814 to act as pinions to fixedly maintain engagement.

Figure 11:
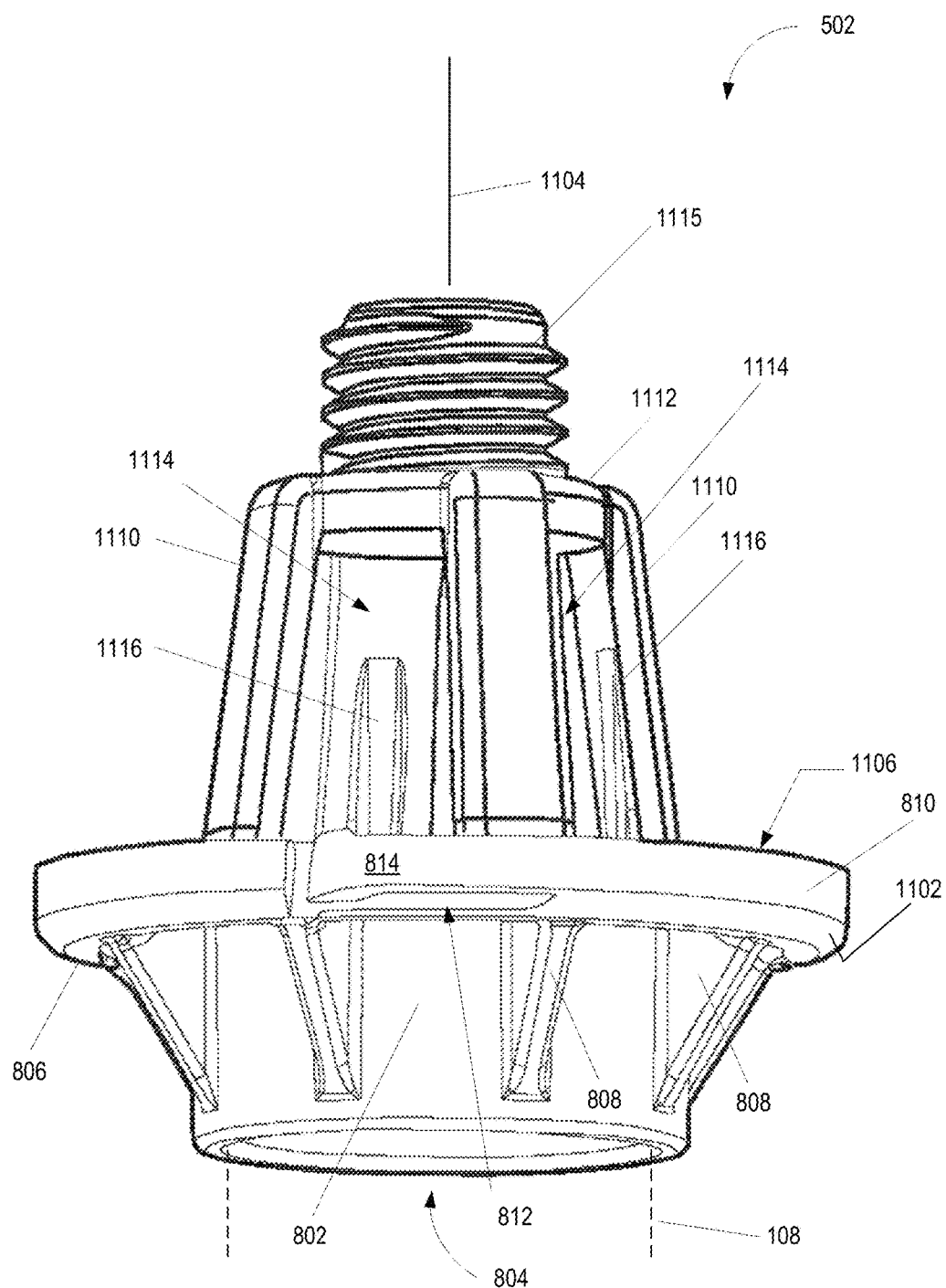
FIG. 11 is a perspective view of an example of a conduit pilot mechanism including in a liquid filter device.

FIG. 11 is a perspective view of an example embodiment of the conduit pilot mechanism 502 illustrating the cylindrical member 802 and the struts 808 coupled with a planar surface 1102 of the shelf 806. The cylindrical member 802 is concentric with a central axis 1104 of the conduit pilot mechanism 502, and defines the central aperture 804, which is formed to receive and be fixedly coupled with the conduit 108. The shelf 806 is also concentric with the central axis 1104, and includes the circumferentially surrounding skirt 810, which is formed to include the clasps 812. An opposing surface 1106 of the shelf 806 is a substantially planar surface formed to contiguously engage the members 302 of the hub 110, and the laterals 112.

Columns 1110 extending away from the opposed surface 1106 of the shelf 806 are coupled with a plate 1112. The plate 1112 is coupled with the columns 1110 on a first surface, and coupled with a threaded barrel 1115 on a second surface. The barrel 1115 may be concentrically aligned with the central axis 1104 and be sized to rotatably engage the socket 306 included in the hub 110. The columns 1110 can be formed to include receptacles 1116 capable of receiving the ribs 322 when the conduit pilot mechanism 502 is rotatably engaged with the socket 306. The receptacles 1116 can be apertures or indentions formed in the respective columns 1110. Thus, when the conduit pilot mechanism 502 is fully engaged with the socket 306, the ribs 322 may be engaged with the receptacles 1116 to fixedly restrain the conduit pilot mechanism 502 from further rotation in either direction with respect to the socket 306 and hub 110.

The columns 1110 are radially disposed concentric with the central axis 1104 to define passageways 1114. The spaced apart columns 1110 allow liquid to flow through the central aperture 804 to the conduit 108 during a filtering cycle and through the central aperture 804 from the conduit 108 during a backflow cycle. As also illustrated in FIGS. 8 and 9, the passageways 1114 are in liquid communication with the hub and the laterals 112. Thus, liquid flowing through the slots 324 of the hub 110 and the laterals 112 can also flow through the conduit 108. In alternative embodiments where the conduit pilot mechanism 502 is omitted, conduit 108 may be formed to include similar functionality.

Figure 12:
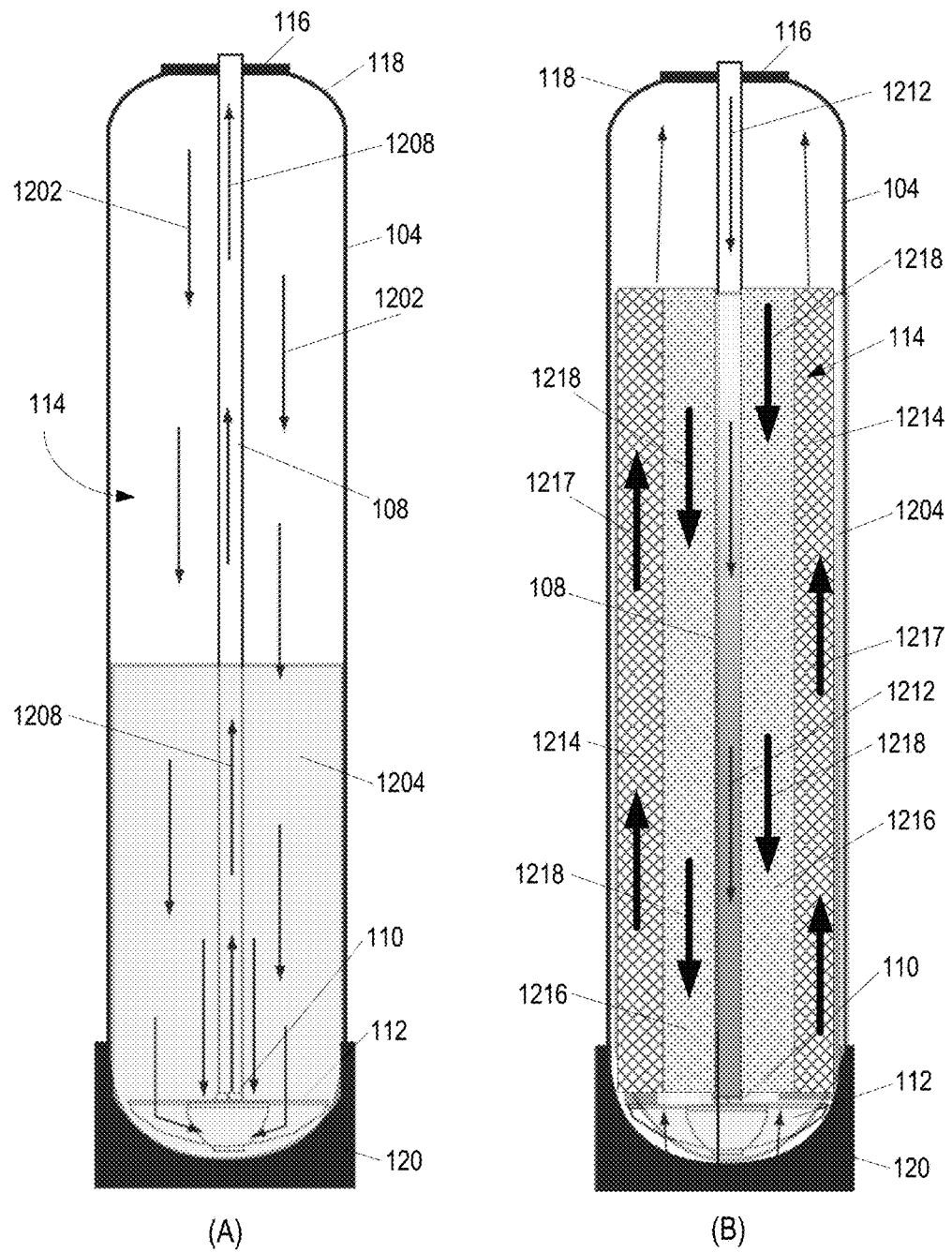
FIG. 12 is an example schematic illustrating an example of operation of a liquid filter device.

FIG. 12 is a cutaway side view schematic of an example embodiment of the liquid filter device 100 depicting the tank 104, the conduit 108, the hub 110 and the laterals 112. In an embodiment, the liquid filter device 100 can operate in a number of modes including a filter mode as illustrated in FIG. 12A and a backwash mode as illustrated in FIG. 12B. During the filter mode, liquid may flow through the opening 116 at the top 118 of the tank 104 into the cavity 114 as illustrated by arrows 1202. The liquid can flow through a filter media 1204 that filters the liquid.

The filter media 1204 can be a granular material that can be uniformly distributed in the tank to surround the laterals, the hub 110 and at least part of the conduit 108. In embodiments, there is only one filter media 1204 substantially uniformly distributed without stratification in the entirety of the tank 104. Filtering of the liquid with the liquid filtering device 100 can involve removal of material included in the liquid such as minerals. For example, iron, and/or sulfur may be removed from the liquid. For removal of sulfur, the filter media 1204 can be a mixed filtration medium including a blended mixture of elements, for example, a redox media of copper-zinc granules; (Centaur) and an activated carbon designed to develop catalytic functionality, which can be produced from bituminous coal. In another example, the filter media 1204 may include a resin, such as polystyrene beads, capable of removing calcium and magnesium from the liquid. Referring to FIGS. 1-12, the controller 106 can control the liquid filtering device 100 during each mode. During the filtering mode, the controller 106 can allow the flow of liquid illustrated by arrows 1202, which flows through the filter media to the bottom 120 of the tank 104 where the liquid enters the slots 322 in the laterals 112 and the hub 110.

Upon entering the chambers 602 of the respective laterals 112, the liquid flows through the ducts 606 of the respective laterals 112 into the interior passageway of the hub 110. Within the hub 110, the liquid may flow through the passageways 1014 in the conduit pilot mechanism 502 to the central aperture 804 and into the conduit 108 as illustrated by arrows 1208. The filtered liquid may then flow out of the conduit 108 and be dispensed via the controller 106 for use.

Referring to FIG. 12B, during the backwash mode, the controller 106 can reverse the flow of liquid in order to flush the filter media by providing flowing liquid to the conduit 108 at the opening 116 as illustrated by arrows 1212. The liquid flowing into the conduit 108 may include agents, such as cleaning or removal agents capable of rejuvenating the filter media 1204 by coming into contact with the filter media and removing material captured in the filter media 1204. In this way, filter media 1204 that has reduced filtering capacity due to use may be restored to a greater degree of filtering capability. In addition, or alternatively, the backwash mode can include an accompaniment cycle, in which an agent can be introduced to the filter media, such as a sodium (Na) agent which may provide an ion exchange in which magnesium, calcium and other mineral deposits captured during the filtering process by the filter media 1204 are exchanged with sodium ions.

Referring to FIGS. 1-12, liquid flowing through the conduit 108 enters the combined structure 500 and flows out through the slots 324 into the cavity 1204. In some examples, where most of the slots 324 are in the top surfaces 504 of the laterals 112, most of the liquid flows through the top surfaces 504 and a lesser amount of liquid flows through the bottom surfaces 700. Alternatively, in some embodiments, the bottom surfaces 700 of the laterals 112 include a relatively larger number of slots 324 than the top surface 504 and a lesser amount of liquid flows through the bottom surfaces 700. In still other embodiments, the flow of liquid flowing through the top surfaces 504 and the bottom surfaces 700 may be substantially the same. Some amount of liquid can also flow out of the slots 324 located in the hub 110 in order to displace filter media located below the laterals 112, and in the areas 506 between the laterals 112. The filter media located below and beside the laterals 112 may be displaced by liquid flow through the slots 324 in the bottom surface 700 during the backwash mode, and filter media located above and beside the laterals 112 may be displaced by liquid flow through the slots 324 in the top surface 504 during the backwash mode.

The liquid is pressurized to flow through the conduit 108. The cross sectional area of the conduit 108 can be equal to or greater than the total cross sectional area of the slots 324. Thus, the liquid flows out the slots 324 into the cavity 114 at a velocity that displaces granules of the filter media near the slots 324. Variation in the number of slots 324, the cross-sectional area of the conduit 108 and the pressure at which the liquid is supplied to the conduit 108 can increase or decrease the volume of the displacement of the granules of the filter media 1204 during the backwash cycle.

Displacement of the filter media 1204 results in active zones 1214 located above each of the laterals 112. In the active zones 1214, the flow of liquid carries the granules of filter media 1204 toward the top 118 of the tank 104 as illustrated by arrows 1217. Thus, the active zones 1214 carry the filter media in the opposite direction to the flow of liquid in conduit 108. In FIG. 12, there are two active zones 1214 depicted, however, the number of active zones 1214 corresponds to the number laterals 112, since each active zone 1214 is positioned above the surface 504 of a respective lateral 112. Thus, in the example configuration of FIG. 5, there will be four active zones 1214. Due to the displacement of the granules, the overall volume of the filter media increases as illustrated in the comparison of FIG. 12B to FIG. 12A.

As the granules are displaced by the flow of liquid to locations further from the laterals 112, the granules can move into inactive zones 1216 in which the granules fall by gravity back toward the bottom 120 of the tank 104 as illustrated by arrows 1218. Granules moving in the inactive zones 1216 in the same direction as the flow of liquid in the conduit 108 due to the absence of a flow of liquid in the inactive zones 1216. Each of the inactive zones 1216 can be positioned between the active zones 1214. Thus, in the example configuration of the combined structure 500 depicted in FIG. 5, there are four inactive zones 1216, each separated from the other inactive zones 1216 by an active zone 1214.

Liquid flowing through the active zones 1214 exits from the filter media 1214 near the top 118 of the tank 108. Displacement of the granules towards the top of the tank 108 while the granules are in the active zones 1214 results in desirable vigorous mixing of the liquid and the granules, which provides efficient and thorough extraction of the material captured by the filter media during the filter mode.

Due to the velocity of granules, the active zones 1214 can extend to near the top 118 of the tank 104. Thus, the corresponding inactive zones 1216 can similarly extend to near the top 118 of the tank 104. Liquid flowing near the opening 116 of the tank 104 may not be part of the active or inactive zones 1214 or 1216 due to the gravitational effect imposed on the granules.

Granules of different densities and/or sizes can still be efficiently and effectively backwashed by adjusting the flow rate to create the active zones 1214 and the inactive zones 1216. Due to the constant agitation of the granules during a backwash cycle, the liquid is constantly flowing around the granules thereby optimizing the opportunity for the backwash fluid to contact all different parts of the filter media and remove filtered materials adhered to or lodged in the filter media.

The methods, devices, techniques, and logic described above may be implemented in many different ways in many different combinations of hardware, software or firmware or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits interconnected through trusted links. All or part of the logic described above may be implemented as instructions for execution by a processor, controller, or other processing device and may be stored in a tangible or non-transitory machine-readable or computer-readable medium such as flash memory (FLASH), random access memory (RAM) or read only memory (ROM), programmable read only memory (PROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

I claim:
1. A liquid filter device comprising:
a hub including a base having a socket, and a plurality of members positioned to extend upwardly from an outer periphery of the base and form a plurality of respective slots therebetween;
a plurality of laterals having a first end and a second end, the first end of each of the laterals positioned in the respective slots and including a pair of opposing vertical slots slidably engaging the members of the hub to form a structure positionable in a tank, each of the laterals extending radially in different directions away from the hub such that the second ends are spaced away from the hub;
a conduit pilot mechanism engaged with the socket of the hub, and including a circumferential skirt engaged with upper surfaces of the first ends of the laterals to maintain the opposing vertical slots on the first ends of the laterals slidably engaged with the members of the hub, and a central aperture at a top of the conduit pilot mechanism for receiving a conduit; and
each of the laterals formed to include an internal cavity, the internal cavity formed with a first volume at the first end and a second volume between the first end and the second end, the second volume being larger than the first volume.

2. The liquid filter device of claim 1, wherein the second volume of the internal cavity is progressively larger toward the second end.

3. The liquid filter device of claim 1, wherein each of the laterals is slidably and detachably coupled with the hub.

4. The liquid filter device of claim 1, wherein each member of the hub includes a keeper, and upper ends of the vertical slots on the first ends of the laterals engage the respective keepers to fixedly engage the members with the respective slots.

5. The liquid filter device of claim 1, wherein the conduit pilot mechanism is rotatably coupled with the socket and comprises a clasp for engaging an ear on a member of the hub to arrest rotation of the hub with respect to the conduit pilot mechanism.

6. The liquid filter device of claim 1, wherein liquid flowing in a first direction is first received by each of the laterals and is channeled to the hub by the respective laterals, and liquid flowing in a second direction is first received by the hub and is channeled to the laterals, and out of the laterals through slots formed on at least one of a top surface or a bottom surface of each of the laterals.

7. A liquid filter device comprising:
a tank having a tank base and an opening formed in the tank opposite the tank base;
a conduit positioned in the tank to receive and channel a flow of liquid;
a hub positioned in the tank adjacent the tank base, the hub including a base having a socket, a plurality of members positioned to extend upwardly from an outer periphery of the base and form a plurality of respective slots therebetween;
a plurality of laterals having a first end and a second end, the first end of each of the laterals positioned in the respective slots and including a pair of opposing vertical slots slidably engaging the members of the hub, the plurality of laterals extending radially in different directions away from the hub perpendicular to a central axis of the conduit;
a conduit pilot mechanism engaged with the socket of the hub, and including a circumferential skirt engaged with upper surfaces of the first ends of the laterals to maintain the opposing vertical slots on the first ends of the laterals slidably engaged with the members of the hub, and a central aperture at a top of the conduit pilot mechanism for receiving the conduit;

the conduit being sized to extend a length of the tank such that a second end of the conduit is positioned at the opening formed in the tank, and the hub and laterals are positioned opposite the opening at the tank base; and filtration media disposed in the tank, the filtration media being uniformly distributed in the tank to surround the laterals, the hub and at least part of the conduit.

8. The liquid filter device of claim 7, wherein the plurality of laterals are positioned with respect to each other so that a flow of liquid through the hub and the laterals creates a plurality of active zones separated from one another by a plurality of inactive zones in the tank, the active zones located above the respective laterals in which filtration media included in the tank moves in a direction opposite to the flow of liquid through the conduit, and creates a plurality of inactive zones between the laterals in which the filtration media moves in a same direction as the flow of liquid in the conduit.

9. The liquid filter device of claim 7, wherein the laterals and the hub are individually sized to pass through the opening.

10. The liquid filter device of claim 7, wherein a combination of more than two of the laterals coupled with the hub form a partial assembly that is larger than the opening in the tank.

11. The liquid filter device of claim 7, wherein each of the laterals includes a first surface facing toward a bottom of the tank, and a second surface facing toward a top of the tank, the first surface and the second surface each including a slot that provides liquid communication with an internal cavity formed in a respective one of the laterals, and the second surface having a contour substantially aligned with a bottom interior surface of the tank.

12. The liquid filter device of claim 7, wherein an ingress and egress of the laterals is positioned between a first end and a second end of the laterals, and each of the laterals are wedge shaped such that the first end is smaller than the second end.

13. The liquid filter device of claim 7, wherein the laterals are spaced to create active zones above each of the laterals within which material is displaced upwardly when liquid is emitted from the laterals, and inactive zones where material can move in an opposite direction toward the tank base.

14. A liquid filter device comprising:
a tank having an opening to an internal cavity formed in the tank;
a conduit disposed in the tank to receive and channel a flow of liquid between the opening in the tank and a bottom of the tank;
a hub sized to be received through the opening, the hub positionable near the bottom of the tank, the hub including a base having a socket and a plurality of members positioned to extend upwardly from an outer periphery of the base, wherein sides of the members define vertical rails and a plurality of vertical slots between rails of adjacent members;
a plurality of laterals each individually sized to be received through the opening in the tank and slidably coupled with the hub to extend radially in different directions away from the hub to form a combined structure that cannot be received through the opening in the tank, the plurality of laterals having a first end and a second end, the first end of each of the laterals positioned in the respective slots and including a pair of opposing vertical slots engaging the members of the hub; and
a conduit pilot mechanism engaged with the socket of the hub, and including a circumferential skirt engaged with upper surfaces of the first ends of the laterals to maintain the opposing vertical slots on the first ends of the laterals slidably engaged with the members of the hub, and a central aperture at a top of the conduit pilot mechanism for receiving the conduit.

15. The liquid filter device of claim 14, wherein a combined structure that includes the hub and the plurality of laterals is positionable at an end of the tank opposite the opening, such that a first end of the laterals are coupled with the hub, and a second end of the laterals are concentrically distributed adjacent a surrounding outer wall of the tank.

16. The liquid filter device of claim 14, wherein the conduit is sized to extend a length of the tank such that a first end of the conduit is positioned at the opening in the tank, and the hub and laterals are positioned at a bottom of the tank opposite the opening and encompassed by a filtration media uniformly distributed in the tank to surround the laterals, the hub, and at least part of the conduit.

17. The liquid filter device of claim 14, wherein the conduit is in liquid communication with the laterals through the conduit pilot mechanism and the hub, and the conduit pilot mechanism is rotatably coupled to the socket and comprises a clasp for engaging an ear on a member of the hub to resist counter rotation of the hub with respect to the conduit pilot mechanism.

* * * * *